United States Patent [19]

Voigt et al.

[11] 4,275,049
[45] Jun. 23, 1981

[54] CATALYTIC PROCESS FOR CONVERTING HYDROGEN CYANIDE INTO AMMONIA

[75] Inventors: Carl Voigt, Rodenbach; Peter Kleinschmit, Hanau, both of Fed. Rep. of Germany

[73] Assignee: Degussa Aktiengesellschaft, Frankfurt, Fed. Rep. of Germany

[21] Appl. No.: 174,828

[22] Filed: Aug. 4, 1980

[30] Foreign Application Priority Data

Aug. 9, 1979 [DE] Fed. Rep. of Germany ....... 2932322

[51] Int. Cl.³ .............................................. C01C 1/00
[52] U.S. Cl. .................................. 423/352; 252/416; 252/466 PT
[58] Field of Search ................. 423/352; 252/466 PT, 252/416

[56] References Cited

U.S. PATENT DOCUMENTS 4,141,817  2/1979  McVicker et al. ............ 252/466 PT

OTHER PUBLICATIONS

Beilstein Hanelbuch der Organischen Chemie vol. II (1920), 4th Edition, p. 36.

*Primary Examiner*—O. R. Vertiz
*Assistant Examiner*—Wayne A. Langel
*Attorney, Agent, or Firm*—Cushman, Darby & Cushman

[57] ABSTRACT

Hydrogen cyanide in hydrogen cyanide containing gas is transformed into ammonia by a special iridium catalyst in the presence of at least the equivalent amount of hydrogen for the change.

6 Claims, 1 Drawing Figure

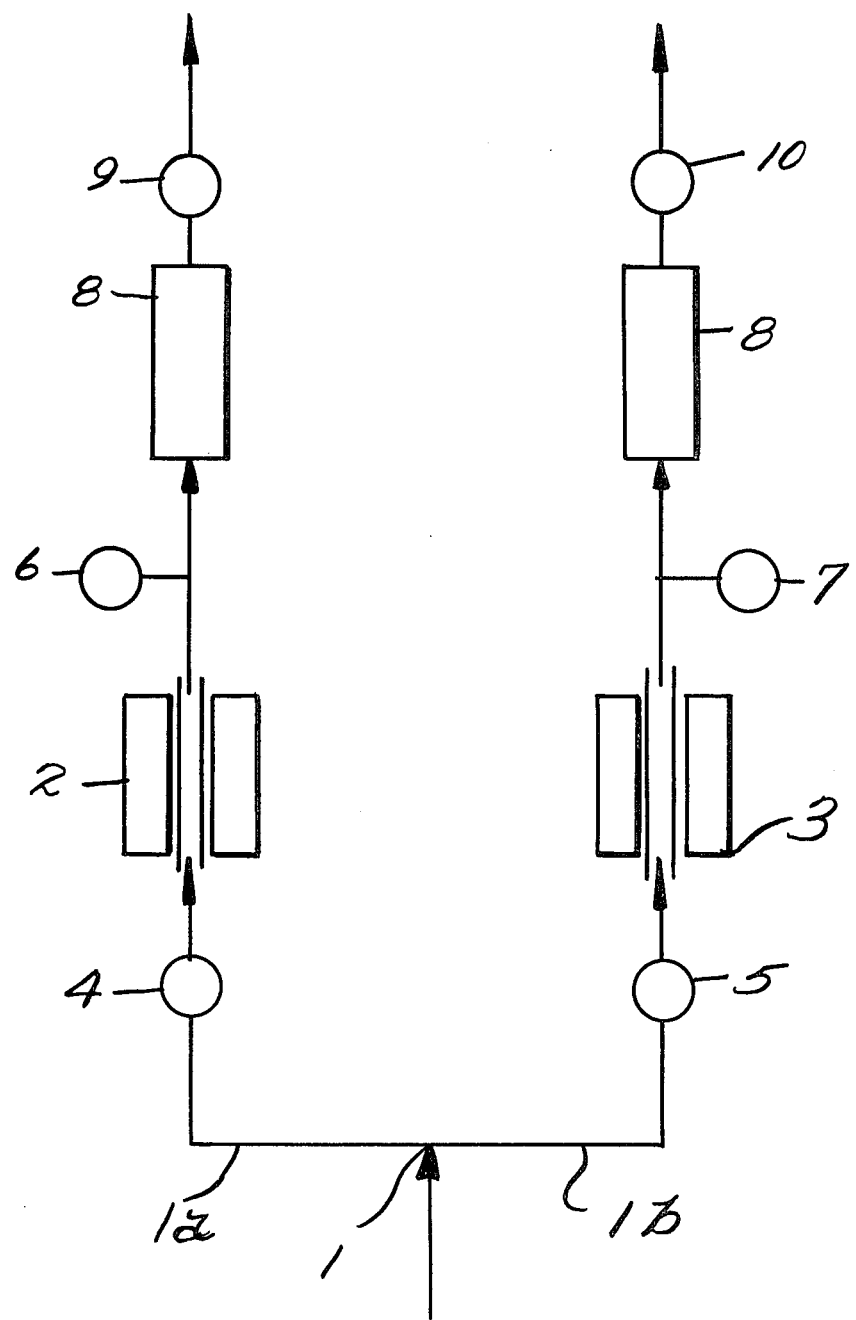

CATALYTIC PROCESS FOR CONVERTING HYDROGEN CYANIDE INTO AMMONIA

BACKGROUND OF THE INVENTION

Hydrogen cyanide is obtained in a large number of industrial processes either directly or accumulates as a byproduct.

Thus one begins with the customary industrial process for the production of hydrogen cyanide from hydrocarbons and ammonia with or without the presence of oxygen, or obtains hydrocyanic acid, e.g. as byproduct in the so-called Sohio synthesis for the recovery of acrylonitrile (Ullmann, Enzyklopadie der technischen Chemie, Vol. 9, 4th Edition, pages 657 et seq.).

Also coke plant, refinery and furnace gases contain hydrogen cyanide in various amounts, see Ullmann, loc. cit.

In all processes for production there are obtained hydrogen cyanide containing waste gases, as is also true with coke plant, refinery and furnace gases, which contain so little hydrogen cyanide that their working up to hydrogen cyanide or hydrogen cyanide containing compounds does not pay.

In all of these cases previously it was much commoner for separation or rendering non-toxic the hydrocyanic acid containing gases to use absorption, adsorption or thermal processes. (Winnacker-Kuchler, Vol. 7 (1975) pages 693 et seg.).

However, in the absorption methods the hydrocyanic acid is converted thereby into cyanide compounds which usually requires an expensive decontamination since a further use is seldom possible because of their low purity. Also there is always the danger of a spontaneous polymerization in the presence of alkalies.

Adsorptive processes, e.g. with activated carbon, aluminum oxide or molecular sieves, indeed have the advantages that they are capable of regeneration, however, they assume that the gases added do not contain suspended matter; however, additionally the polymerization of hydrocyanic acid occurs preferably on large surface areas so that the adsorption towers can be clogged after a short time.

Industrial processes, as e.g. the freezing of hydrocyanic acid from the gases are only meaningful industrially with sufficiently high concentrations of hydrocyanic acid.

A flame combustion in torches or a catalytic combustion, e.g. in the presence of metal oxides, see German OS 2531720, indeed permits accomplishment of the result with simple means but besides the total loss of hydrocyanic acid usually leads to a high loading of the environment.

The change of hydrogen cyanide to ammonia through hydrolysis in aqueous medium or through reductive splitting is known as of itself (Gmelin, N-Vol. 4, page 365).

Thus, e.g there is used the hydrolysis of the hydrogen cyanide in the Kjeldahl method for determination of total nitrogen.

However, this method is not suited for the industrial transformation of hydrogen cyanide containing gases into ammonia containing gases.

Indeed it is also known according to Beilstein's Handbuch der Organischen Chemie, Vol. II, 1920, 4th Edition, page 36 to obtain ammonia through reduction of hydrogen cyanide with hydrogen in the presence of nickel above 250° C., but only as a component of a mixture with the methyl amines.

Likewise the non-catalytic process described in German Pat. No. 232,878 in which hydrogen cyanide containing gases are reacted at at least 1000° C. with steam to form ammonia, only represents an illustration of the hydrolysis process.

It was the problem of the present invention to develop a process for changing hydrogen cyanide containing gases into valuable materials.

SUMMARY OF THE INVENTION

It has now been found that ammonia can be produced practically quantitatively from hydrogen cyanide in the gas phase which gas consists essentially of cyanides or other nitrogen containing materials or mixtures of materials in the presence of a catalyst as well as hydrogen at elevated temperature if the hydrogen cyanide containing gas is led at a temperature of 100°-600° C., preferably between 200°-400° C., over an iridium catalyst which is produced by reduction of a hexachloroiridium IV acid on activated aluminum oxide (activated alumina) and in the presence of at least the equivalent amount of hydrogen to change the hydrogen cyanide present and the practically hydrogen cyanide free, ammonia containing gas is then drawn off from the reaction space.

The process of the invention is usable for all purposes in which hydrogen cyanide is employed or in which it can form.

The process of the invention is preferably carried out continuously.

As hydrogen cyanide in the gaseous phase which consists of cyanides or other nitrogen containing materials or mixtures of materials there can be suitably employed the waste gases obtained in the production of hydrogen cyanide from ammonia and hydrocarbons, in a given case in the presence of oxygen, or the waste gases obtained in the ammonoxidation of hydrocarbons to nitriles, as well as the already mentioned gases from coke plants, refineries or furnaces, as well as, e.g., in hardening plants.

The necessary amount of hydrogen for the quantitative conversion of the hydrogen cyanide present into ammonia is either partially or entirely present already in the industrial gases, otherwise it must be mixed in before leading the gases under investigation over the catalyst. Preferably there is used a certain excess of hydrogen over the stoichiometric amount. Additional hydrogen if necessary is used in the customarily industrial quality in a given case in admixture with inert gases such as nitrogen.

The required iridium catalyst for the selective transformation of hydrogen cyanide into ammonia is produced in the customary way in the following manner by reduction of hexachloroiridium IV acid on active aluminum oxide, see Ullmann, Enzyklopadie der technischen Chemie, Vol. 14, 1963 page 33 and Vol. 9, 1957, page 273.

Active aluminum oxide in customary form, however, preferably in the form of pellets, is impregnated in the customary manner with an aqueous solution of the above-mentioned hexachloroiridium IV acid and dried at 100°-300° C. in a nitrogen stream and subsequently reduced at 200°-300° C. in a stream of hydrogen. This sequence of impregnation, drying and reduction is generally repeated three to four times. The BET surface area of the active ammonium oxide is between 50 and 250 m²/g Al₂O₃.

With slackening of the activity the catalyst can be regenerated, namely through calcining in oxygen or an oxygen containing gas, preferably in air, for several hours, e.g. 3 to 8 hours, at elevated temperatures of 300°–600° C., whereupon the so calcined catalyst is treated with hydrogen for several further hours, i.s. 3 to 8 hours, at a likewise elevated temperature of 200°–300° C. The catalyst regenerated in this manner still has an activity of 90 to nearly 100% of the starting activity. The activity reached after the regeneration depends first on the size of the previous decrease in catalyst activity and besides on the length and temperature of the calcination and reduction treatment.

A preferred method for the production of the iridium catalyst consists of the following:

10 grams of γ Al₂O₃ pellets (97 m²/g surface area, 0.495 kg/l bulk density) were treated with an iridium solution which was produced in the following manner:

13.02 grams of hexachloroiridium-IV-acid hexahydrate $H_2IrCl_6.6H_2O$ having 38.4 weight % Ir, $\triangleq$ 5 g iridium were treated with 2 ml of concentrated HCl (37 weight %) and the total solution filled up to 48 ml with water.

The solution was used in 8 portions of 6 ml each.

After each impregnation the pellets were preliminarily dried in the drying cabinet at 105° C. for about 20 minutes and subsequently dried for 2 hours at 200° C. in a stream of nitrogen, impregnated again with 6 ml of solution, again dried under the same conditions and subsequently exposed for 2 hours at 250° C. to a gaseous stream of pure hydrogen (moisture free).

This process was repeated at least three to four times.

The catalyst can be employed directly in this form.

For regeneration of the catalyst reduced in its activity the calcination is preferably carried out for 5 hours at 500° C. and the subsequent reduction at 260° C. and in the latter case 10 liters of hydrogen per hour per gram of catalyst led over the latter.

The gas obtained according to the process of the invention and now containing ammonia can be used in known manner for syntheses in which ammonia is needed, e.g. for the production of ammonium salts such as ammonium phosphates, sulfate or nitrate.

However, the gases freed of hydrogen cyanide by the process of the invention are also usable in organic syntheses in which ammonia is employed.

It was very surprising that the iridium catalyst used according to the invention was capable of changing hydrogen cyanide selectively and practically quantitatively into ammonia without the formation of disturbing byproducts. Because of this the utilization of the iridium catalyst becomes profitable.

The process can comprise, consist essentially of or consist of the steps set forth with the stated materials.

BRIEF DESCRIPTION OF THE DRAWINGS

The single FIGURE of the drawings diagrammatically shows the apparatus for carrying out the invention.

The invention is further explained in connection with the following examples.

DETAILED DESCRIPTION OF THE INVENTION

EXAMPLE A

In order to demonstrate the selective catalytic activity of the iridium catalyst a starting gas stream which e.g. contains a composition of 22–25 mol % hydrogen cyanide, 3–5 mol % ammonia, 70–75 mol % hydrogen and small amounts of nitrogen, methane and carbon monoxide using the apparatus of the drawing was divided at 1 into two equal gas streams and led via lines 1a and 1b into the two parallel connected furnaces 2 and 3. The measurement of amounts took place in the two rotameters 4 and 5; the pressure was determined in the two manometers 6 and 7. In each furnace there was located a certain tube which in one case was filled with the catalyst to be tested and in the other case remained empty. Subsequently, the unreacted ammonia was absorbed in sulfuric acid and the unreacted hydrocyanic acid was absorbed in aqueous sodium hydroxide at 8 and analyzed according to the customary wet chemical methods. The amount of residual gas was measured at 9 and 10 with customary gas meters.

Example 1

The iridium catalyst produced in the above-described manner was filled into one of the two ceramic tubes and its decomposition activity measured compared to that of the empty tube. The temperature in both furnaces was 400° C. In all 99.12% of the hydrocyanic acid in the starting gas was converted into ammonia with the acid of the catalyst.

Example 2

In a manner analogous to Example I but with a furnace temperature of 300° C. the change of HCN to $NH_3$ took place in an amount of 99.68%.

Example 3

A catalyst which after long use had spent its activity was regenerated in the following manner:

5 hours at 500° C. under air and subsequently 6 hours at 260° C. under hydrogen.

A catalyst regenerated in this manner was tested at 400° C. and there was ascertained thereby a conversion of hydrocyanic acid to ammonia of 99.26%.

Comparison Example I

The conditions were analogous to Example 1 but there was used a furnace temperature of 25° C. There was not detected any change from HCN to $NH_3$.

Comparison Example II

Here also the procedure was as in Example 1 but there was used a furnace temperature of 800° C. The transformation of HCN to $NH_3$ was 72.54%.

Comparison Example III

The experiment was carried out in a manner analogous to Example 1 but employing a furnace temperature of 1000° C. The transformation of HCN to $NH_3$ was 83.2%.

The results from Examples 1–3 were ascertained in several series of experiments and constructed as average values. At 20 ml bulk volume of the catalyst and 100 l of reaction gas per hour the speed-velocity was 5000 h$^{-1}$.

The entire disclosure of German priority application P 29 32322.6-41 is hereby incorporated by reference.

What is claimed is:

1. A catalytic process for the production of ammonia from hydrogen cyanide and hydrogen at elevated temperature comprising leading a hydrogen cyanide containing gas and hydrogen at a temperature of 100°–600° C. over an iridium catalyst prepared by reducing hexachloroiridium IV acid on active aluminum oxide, the amount of hydrogen being at least the equivalent amount required to convert all of the hydrogen cyanide to ammonia, and drawing off gas containing ammonia and practically free from hydrogen cyanide from the reaction space.

2. The process of claim 1 wherein the reaction temperature is 200° to 400° C.

3. The process of claim 2 wherein the iridium catalyst used is produced by impregnating active aluminum oxide having a surface area of 50–250 $m^2/g$ with an aqueous solution of a hexachloriridium IV acid, subsequently drying at 100°–300° C. in a stream of nitrogen and then reducing at 200–300° C. in a hydrogen stream.

4. The process of claim 3 wherein the sequence of impregnation, drying and reducing is repeated at least three times.

5. The process of claim 3 including the step of regenerating spent catalyst by calcining it for 3 to 8 hours at 300°–600° C. in an oxygen containing gas and then treating it with hydrogen at 200°–300° C.

6. The process of claim 1 wherein the iridium catalyst used is produced by impregnating active aluminum oxide having a surface area of 50–250 $m^2/g$ with an aqueous solution of a hexachloriridium IV acid, subsequently drying at 100°–300° C. in a stream of nitrogen and then reducing at 200°–300° C. in a hydrogen stream.

* * * * *